United States Patent
Brown (10) Patent No.: US 10,180,155 B2
(45) Date of Patent: Jan. 15, 2019

(54) FURNITURE JOINERY

(71) Applicant: Michael T. Brown, Shelbyville, KY (US)

(72) Inventor: Michael T. Brown, Shelbyville, KY (US)

(73) Assignee: MB Industries, Inc., Shelbyville, KY (US)

( * ) Notice: Subject to any disclaimer, the term of this patent is extended or adjusted under 35 U.S.C. 154(b) by 199 days.

(21) Appl. No.: 14/922,874

(22) Filed: Oct. 26, 2015

(65) Prior Publication Data

US 2017/0114813 A1   Apr. 27, 2017

(51) Int. Cl.
| | |
|---|---|
| *F16B 12/46* | (2006.01) |
| *F16B 12/12* | (2006.01) |
| *A47B 13/04* | (2006.01) |
| *A47C 4/03* | (2006.01) |

(52) U.S. Cl.
CPC ............ *F16B 12/46* (2013.01); *F16B 12/125* (2013.01); *A47B 13/04* (2013.01); *A47B 2230/0081* (2013.01); *A47C 4/03* (2013.01); *F16B 2012/466* (2013.01)

(58) Field of Classification Search
CPC .............. F16B 2012/466; F16B 12/125; F16B 2012/043; F16B 2012/046; A47B 2230/0081
See application file for complete search history.

(56) References Cited

U.S. PATENT DOCUMENTS

| | | |
|---|---|---|
| 110,013 A | 12/1870 | Cougle |
| 136,837 A | 3/1873 | Jefts |
| 194,903 A | 9/1877 | Hass |
| 242,513 A | 6/1881 | Crane |
| 422,843 A | 3/1890 | Smith |
| 456,377 A | 7/1891 | Goedeke |
| 473,151 A | 4/1892 | Good et al. |
| 478,857 A | 7/1892 | Harman et al. |

(Continued)

FOREIGN PATENT DOCUMENTS

| | | | | |
|---|---|---|---|---|
| DE | 102012009035 B4 | * 11/2015 | ............. | E06B 3/984 |
| EP | 0671566 | 9/1995 | | |

(Continued)

OTHER PUBLICATIONS

The Hague, European Search Report and Written Opinion for EP App. No. 16195378 dated Feb. 8, 2017.

(Continued)

*Primary Examiner* — Matthieu F Setliff
(74) *Attorney, Agent, or Firm* — Middleton Reutlinger (57) ABSTRACT

A furniture joinery includes a slide rail having a plurality of grooves or slides, a trapezoidal shaped slide block having the other of the plurality of grooves or slides, and a furniture support. One of the slide rail or the furniture support includes at least one tenon extending therefrom. The other of the slide rail or the furniture support includes an aperture which receives the at least one tenon. The at least one tenon includes at least one of a notch or a rib and the aperture includes the other of the notch or rib. The aperture is sized to allow movement of the tenon into the aperture and movement of one of the notch or rib toward the other of the notch or rib when the slide block is connected to the furniture support.

17 Claims, 12 Drawing Sheets

(56) References Cited

U.S. PATENT DOCUMENTS

| | | |
|---|---|---|
| 480,536 A | 8/1892 | Welker |
| 495,857 A | 4/1893 | Volz |
| 509,618 A | 11/1893 | Goodyear |
| 512,992 A | 1/1894 | Ritchey |
| 533,766 A | 2/1895 | Williams |
| 545,538 A | 9/1895 | Sellers |
| 556,869 A | 3/1896 | Sigler |
| 562,133 A | 6/1896 | Grassler |
| 577,229 A | 2/1897 | Bosch |
| 626,554 A | 6/1899 | McLean |
| 636,434 A | 11/1899 | Kendall |
| 637,506 A | 11/1899 | Fries |
| 677,726 A | 7/1901 | Welker, Sr. |
| 766,695 A | 8/1904 | Herzog |
| 836,585 A | 11/1906 | Koeser |
| 917,432 A * | 4/1909 | Hofmeimer ............ F16B 12/04 |
| | | 144/354 |
| 1,181,156 A | 5/1916 | Neal |
| 1,184,297 A | 5/1916 | Balbach |
| 1,214,261 A | 1/1917 | Balbach |
| 1,246,714 A | 11/1917 | Carlson |
| 1,263,116 A * | 4/1918 | Rockwell ............... E06B 3/984 |
| | | 403/382 |
| 1,306,452 A | 6/1919 | White |
| 1,338,202 A | 4/1920 | White |
| 1,389,008 A | 8/1921 | Pohle, Jr. |
| 1,442,770 A | 7/1922 | Kropf |
| 1,480,905 A | 1/1924 | Herbert |
| 1,516,975 A * | 11/1924 | McArthur ............... F16B 9/00 |
| | | 144/347 |
| 1,525,630 A | 2/1925 | Wendl |
| 1,526,009 A | 2/1925 | Partington |
| 1,558,618 A | 10/1925 | Jasper |
| 1,630,521 A | 5/1927 | Bolin |
| 1,644,336 A | 10/1927 | Gunlocke et al. |
| 1,726,362 A * | 8/1929 | Orsenigo ............... F16B 12/24 |
| | | 403/297 |
| 1,770,722 A | 7/1930 | Wright |
| 1,778,135 A | 10/1930 | Williams |
| 1,787,598 A | 1/1931 | Smith |
| 1,813,072 A * | 7/1931 | Murdock ............... F16B 12/46 |
| | | 144/354 |
| 1,834,313 A | 12/1931 | Kaufman |
| 1,843,369 A | 2/1932 | Olsen |
| 1,863,995 A | 6/1932 | Ponstingl |
| 1,876,336 A | 9/1932 | McLaughlin |
| 1,942,003 A | 1/1934 | Rundle |
| 1,989,955 A | 2/1935 | Van Patter |
| 2,077,067 A | 4/1937 | McLellan et al. |
| 2,116,584 A | 5/1938 | Shelby |
| 2,143,542 A | 1/1939 | Clarin |
| 2,169,139 A | 8/1939 | Foote |
| 2,304,481 A | 12/1942 | Shannon |
| 2,371,329 A | 3/1945 | Hirsch |
| 2,395,673 A | 2/1946 | Krantz |
| 2,415,180 A * | 2/1947 | John ........................ E06C 7/08 |
| | | 182/228.4 |
| 2,485,784 A | 10/1949 | Shoenberg |
| 2,503,227 A | 4/1950 | Vining |
| 2,520,231 A | 8/1950 | Anderson |
| 2,522,827 A | 9/1950 | Kelly |
| 2,552,286 A | 5/1951 | Kompass |
| 2,580,707 A | 1/1952 | Underhill |
| 2,588,818 A | 3/1952 | Franks |
| 2,603,545 A | 7/1952 | Haven |
| 2,651,355 A | 9/1953 | Lucas |
| 2,709,485 A | 5/1955 | Haven |
| 2,970,025 A | 1/1961 | Wilson |
| 3,090,086 A | 5/1963 | Fata |
| 3,204,905 A | 9/1965 | Marban |
| 3,399,912 A | 9/1968 | Maspero |
| 3,529,697 A | 9/1970 | Kossian et al. |
| 3,664,011 A | 5/1972 | Labastrou |
| 3,669,479 A | 6/1972 | Payne |
| 3,674,068 A | 7/1972 | Lucci |
| 3,899,258 A | 8/1975 | Matthews |
| 3,957,239 A | 5/1976 | Slaats et al. |
| 3,991,535 A | 11/1976 | Keller et al. |
| 4,032,242 A | 6/1977 | Morris |
| 4,057,356 A | 11/1977 | Nissen |
| 4,072,433 A | 2/1978 | Veyhl |
| 4,138,094 A | 2/1979 | Thir |
| 4,161,977 A | 7/1979 | Baslow |
| 4,168,922 A | 9/1979 | Worrallo |
| 4,300,455 A | 11/1981 | Ornati |
| 4,396,173 A | 8/1983 | Call, Sr. |
| 4,432,590 A | 2/1984 | Lawrence et al. |
| 4,586,310 A | 5/1986 | Baril et al. |
| 4,691,965 A | 9/1987 | Hsiung |
| 4,766,821 A | 8/1988 | Pauer et al. |
| 4,901,383 A | 2/1990 | Yang et al. |
| 4,918,871 A | 4/1990 | Widmann |
| 4,973,187 A | 11/1990 | Sauder |
| 5,042,615 A | 8/1991 | Anderson |
| 5,116,161 A | 5/1992 | Faisst |
| 5,425,520 A | 6/1995 | Masumoto |
| 5,499,886 A | 3/1996 | Short et al. |
| 5,577,451 A | 11/1996 | Yeh |
| 5,621,994 A | 4/1997 | Cobb et al. |
| 5,623,803 A | 4/1997 | Willis |
| 5,658,086 A * | 8/1997 | Brokaw ............... A47B 13/003 |
| | | 144/354 |
| 5,746,325 A | 5/1998 | Lee |
| 5,803,561 A | 9/1998 | Puehlhorn |
| 5,820,089 A | 10/1998 | Lim |
| 6,017,092 A | 1/2000 | Lee |
| 6,058,991 A | 5/2000 | Hill |
| 6,125,604 A | 10/2000 | Holmes |
| 6,179,515 B1 | 1/2001 | Grieser et al. |
| 6,379,074 B1 | 4/2002 | Chin et al. |
| 6,397,551 B1 | 6/2002 | Lewcock et al. |
| 6,413,007 B1 | 7/2002 | Lambright |
| 6,481,177 B1 | 11/2002 | Wood |
| 6,579,033 B2 | 6/2003 | Ajiki |
| 6,691,537 B2 | 2/2004 | Tan |
| 7,559,180 B2 | 7/2009 | Ajiki |
| 7,677,830 B1 | 3/2010 | Brown |
| 7,707,795 B2 | 5/2010 | Yu et al. |
| 8,282,307 B1 | 10/2012 | Brown |
| 2002/0006312 A1 | 1/2002 | Buard |
| 2002/0037195 A1 | 3/2002 | Ajiki |
| 2004/0101358 A1 | 5/2004 | Odorico et al. |
| 2006/0162277 A1 | 7/2006 | Schultz |

FOREIGN PATENT DOCUMENTS

| | | |
|---|---|---|
| EP | 1081393 | 3/2001 |
| EP | 3163096 | 5/2017 |
| FR | 2515014 | 4/1983 |
| SE | 35656 | 8/1912 |

OTHER PUBLICATIONS

List of Citations of Related US Patents.
Transmittal Letter of Related Cases.
European Patent Office, Communication under Rule 71(3) EPC for Application No. 16195378.1 dated Nov. 23, 2017.

* cited by examiner

FURNITURE JOINERY

BACKGROUND

Field of the Invention

Present embodiments relate to furniture joinery. More particularly, present embodiments relate to a slide rail, slide block construction for joining furniture structural components.

Description of the Related Art

Furniture joinery is a term which generally refers to one or more elements or structures used to join two or more components of a piece of furniture. As furniture manufacturing has evolved, the desire for knock-down furniture which may be manufactured in one location and shipped for assembly to another location has increased. Prior art joinery, sometimes utilizes dovetail construction which has various deficiencies. First, the dovetails are difficult to manufacture which results in higher costs being passed to the consumer. The dovetail design also has a weakened area where the dovetail extends from the workpiece. Such area is typically referred to as a neck and receives the majority of the stress created at the joint. Other prior art joinery may utilize a metal brace to join parts. However, these metal to wood connections must have multiple screws to create a lasting rigid joint. Further, chair rails and table aprons often require multiple screws or bolts at each corner of a furniture piece and/or clamps to insure furniture components are tight while glue dries. For example one screw may pass through a joinery element into a leg while other screws may extend into adjacent apron structures in order to tie all of the pieces together rigidly. The use of multiple fasteners or clamping mechanisms results in higher manufacturing costs and increased parts and labor to accomplish a desired task.

Another problem with some knock-down furniture designs is related to shipping. It is desirable to utilizing the least amount of volume in shipping. Where some designs for furniture joinery have required larger portions of a furniture piece to be assembled prior to shipping, the larger partial assemblies result in higher shipping costs where larger assemblies cannot be nested within other structures being shipped. It is desirable that a furniture joinery be developed which decreases the number of fasteners required for ease of assembly and which also may be easily shipped from a collapsed configuration minimizing volume from a manufacturing facility to an assembly facility or a consumer.

Given the foregoing, it will be appreciated that a joinery assembly is desired which may be used with various types of furniture pieces and which allows for easy assembly of such pieces.

The information included in this Background section of the specification, including any references cited herein and any description or discussion thereof, is included for technical reference purposes only and is not to be regarded subject matter by which the scope of the invention is to be bound.

SUMMARY

Various embodiments of furniture joinery are provided for use in building various pieces of furniture. The furniture joinery provides slide rails and slide blocks that define components of the furniture and which connect to furniture supports such as chair or table legs for non-limiting example. The furniture joinery includes at least one aperture or one tenon and the furniture support may alternatively include the other of the aperture or tenon. The aperture or tenon may include one of a notch or a rib and the other of the aperture or tenon may include the other of a notch or a rib, such that the notch and rib engage one another when the slide block is connected to the furniture support.

According to some embodiments, a furniture joinery comprises a slide rail having a plurality of longitudinal grooves, extending parallel to said longitudinal axis, a tenon extending from the slide rail at an end, the tenon including an outwardly facing notch, a substantially trapezoidal shaped slide block having a long surface, a short surface parallel to the short surface and angled surfaces connecting ends of the long and short surfaces, the slide block having a plurality of slides disposed within the plurality of longitudinal grooves, a furniture support including an aperture for receiving the tenon of the slide rail, the aperture including a rib therein, a fastener extending through the slide block and engaging the furniture support wherein tightening of the fastener forces engagement of the notch and the rib.

Optionally, the plurality of slides each may have a neck and a head. The plurality of grooves each may have a first cross-sectional shape. The furniture joinery may further comprise a second cross-sectional shape differing from said first cross-sectional shape. The grooves may extend from a first end to a second end of said slide rail. Alternatively, the grooves may extend from near one end of the slide rail to near a second end of the slide rail. The furniture joinery further comprising a second tenon at the end of the slide rail.

According to some embodiments, a furniture joinery comprises a slide rail having one of a plurality of grooves or a plurality of slides, at least one tenon extending from one of the slide rail or a furniture support, a substantially trapezoidal shaped slide block having the other of the plurality of grooves or the plurality of slides, wherein the plurality of slides may be slidably positioned in the plurality of grooves, an aperture which receives the at least one tenon, the aperture located in the other of said slide rail or said furniture support. The at least one tenon may have at least one of a notch and a rib and the aperture may have the other of the notch and rib. The at least one notch and the rib engaging one another as the slide block is connected to the furniture support.

Optionally, the slide rail may have an upper tenon and a lower tenon. The furniture support may have an upper aperture and a lower aperture corresponding to the upper tenon and the lower tenon. The slide block may have two angled surfaces each having the plurality of slides. The two angled surfaces each engaging one of the slide rail or a second slide rail. The notch may be facing outward and the slide block may be forcing the slide rails outward. The at least one rib may extend generally perpendicularly to a longitudinal direction of the slide rail. The at least one notch may be formed generally perpendicularly to a longitudinal direction of the slide rail. All of the above outlined features are to be understood as exemplary only and many more features and objectives of a furniture joinery may be gleaned from the disclosure herein. Therefore, no limiting interpretation of this summary is to be understood without further reading of the entire specification, claims and drawings, included herewith.

BRIEF DESCRIPTION OF THE DRAWINGS

In order that the embodiments may be better understood, embodiments of the furniture joinery will now be described by way of examples. These embodiments are not to limit the scope of the claims as other embodiments of the furniture joinery will become apparent to one having ordinary skill in the art upon reading the instant description. Non-limiting examples of the present embodiments are shown in pictures wherein:

DETAILED DESCRIPTION

It is to be understood that the furniture joinery is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

Referring now in detail to the figures, wherein like numerals indicate like elements throughout several views, there are shown in FIGS. 1-12 various embodiments of furniture joinery are provided for use in building various pieces of furniture. The furniture joinery provides slide rails and slide blocks that define components of the furniture and which connect to furniture supports such as chair or table legs for non-limiting example. The furniture joinery includes at least one aperture or one tenon and the furniture support may alternatively include the other of the aperture or tenon. The aperture or tenon may include one of a notch or a rib and the other of the aperture or tenon may include the other of a notch or a rib. The notch and rib engage one another when the slide block is connected to the furniture support. This causes engagement between the notch and the tenon and inhibits removal of the joinery from the furniture support.

Figure 1:
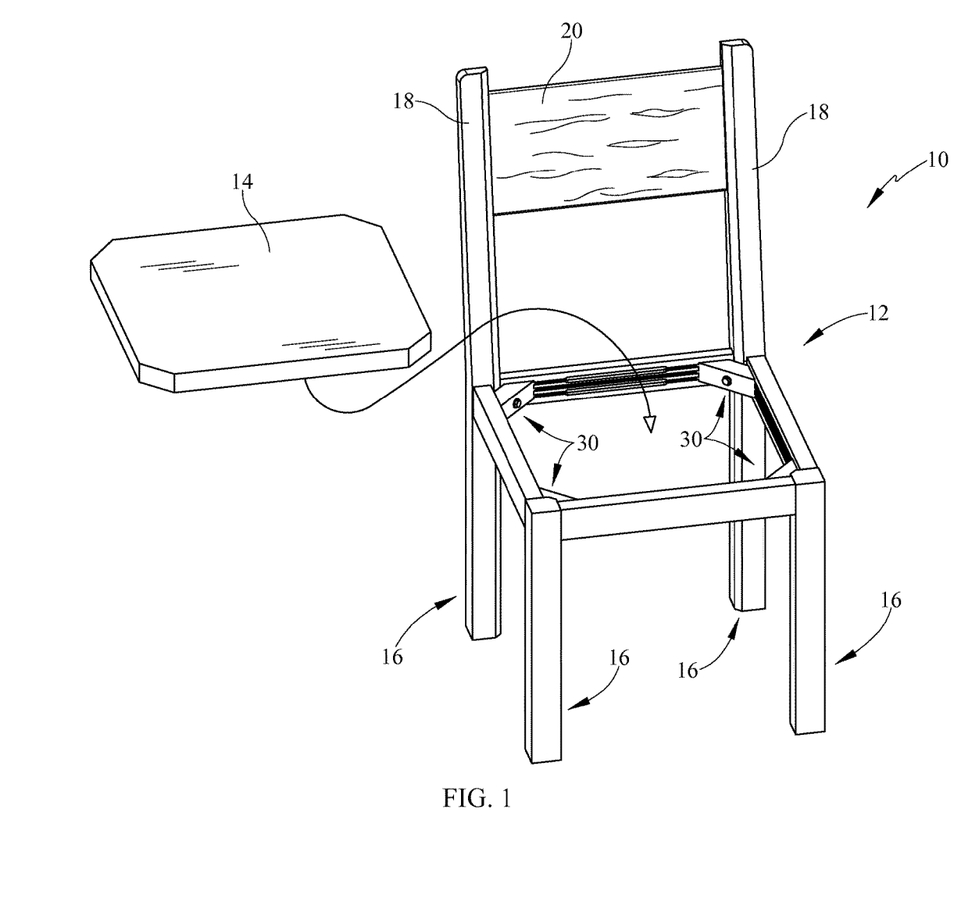
FIG. 1 depicts a partially exploded perspective view of a chair utilizing the furniture joinery.

Referring now to FIG. 1, a piece of furniture 10 is shown. In the first embodiment, the furniture is depicted in non-limiting fashion as a chair 12. The chair 12 may include a seat 14 which is connected to furniture supports 16. The furniture supports 16 are located at four corners and include two front supports 16 and two rear supports 16. The rear supports 16 extend upwardly to define chair back supports 18 which may be integrally formed with the lower furniture supports 16 or may be connected by way of fastener or other means. The chair back supports 18 provide for positioning of a chair back 20 extending therebetween or connected to both of the supports 18. The chair back 20 may be formed of a material with structural supports inside, wicker, plastic, wood or other structures which may support a person's weight when seated in the chair 12 and may be connected between, to or around the chair back supports 18.

Extending between the supports or legs 16 are various pieces or components of furniture joinery 30. The furniture joinery 30 is utilized to construct the furniture 10 and maintain connection of parts while also easing assembly. The present furniture joinery 30, and the furniture 10 in general, may be formed of various materials including but not limited to wood or other molded parts. The furniture joinery 30 is partially hidden by the seat 14 once the seat is positioned on the chair 12.

Figure 2:
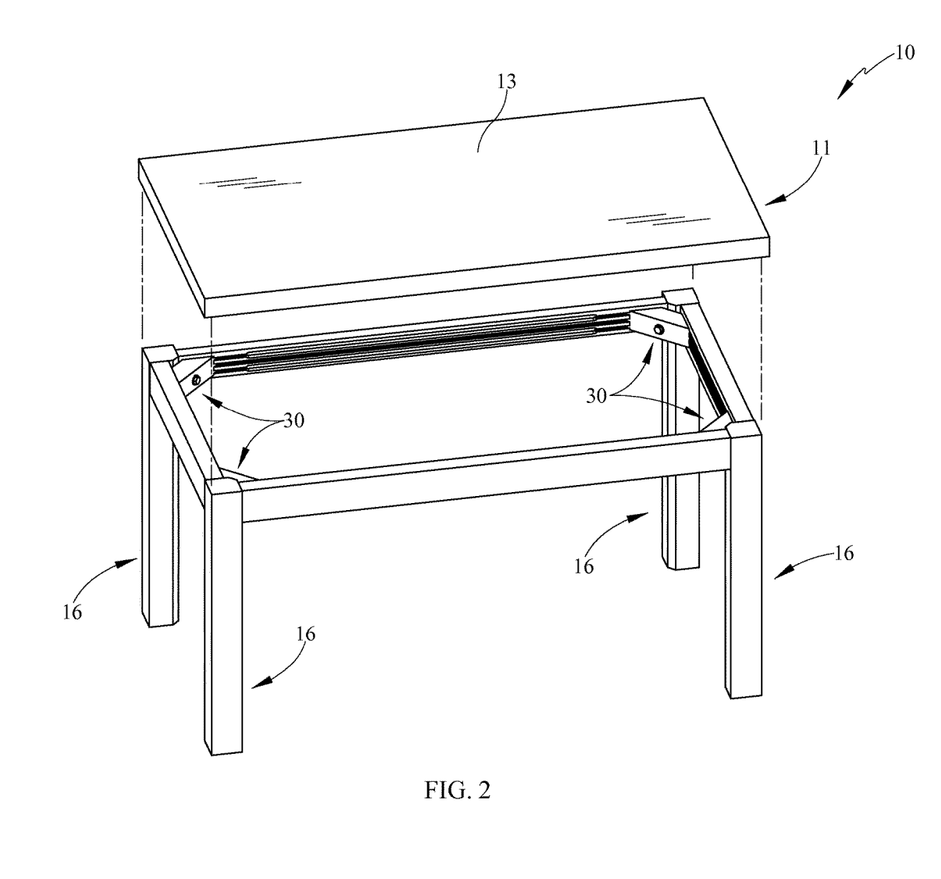
FIG. 2 depicts a partially exploded perspective view of alternate furniture in the form of a table utilizing the furniture joinery.

Referring now to FIG. 2, an alternative furniture 10 is shown in the form of a table 11. The table 11 includes a table top 13 and a plurality of furniture supports 16. The table 11 also comprises furniture joinery 30 which is generally of the same or similar structure to the embodiment of the chair 12 (FIG. 1) but may be of longer dimension or slightly different geometry. Further, while four supports are utilized in these embodiments, other alternate number of legs or supports may be used. As with the chair 12, the furniture joinery 30 is utilized to connect the furniture supports 16 with the other components of the furniture 10 so as to provide ease of construction, as well as a locking assembly which renders disconnection or disassembly difficult, if not impossible.

As with the embodiment of FIG. 1, the table 11 may be formed of various materials including wood, molded plastics, metal or other materials which may be used to form a furniture 10 and render the table 11 desirable for use, and sturdy.

While a chair and table are shown in these figures, it should be understood that other pieces of furniture may be utilized with the features of the furniture joinery 30. Any type of furniture may be formed with the furniture joinery 30 where multiple components or structural elements may be combined.

Figure 3:
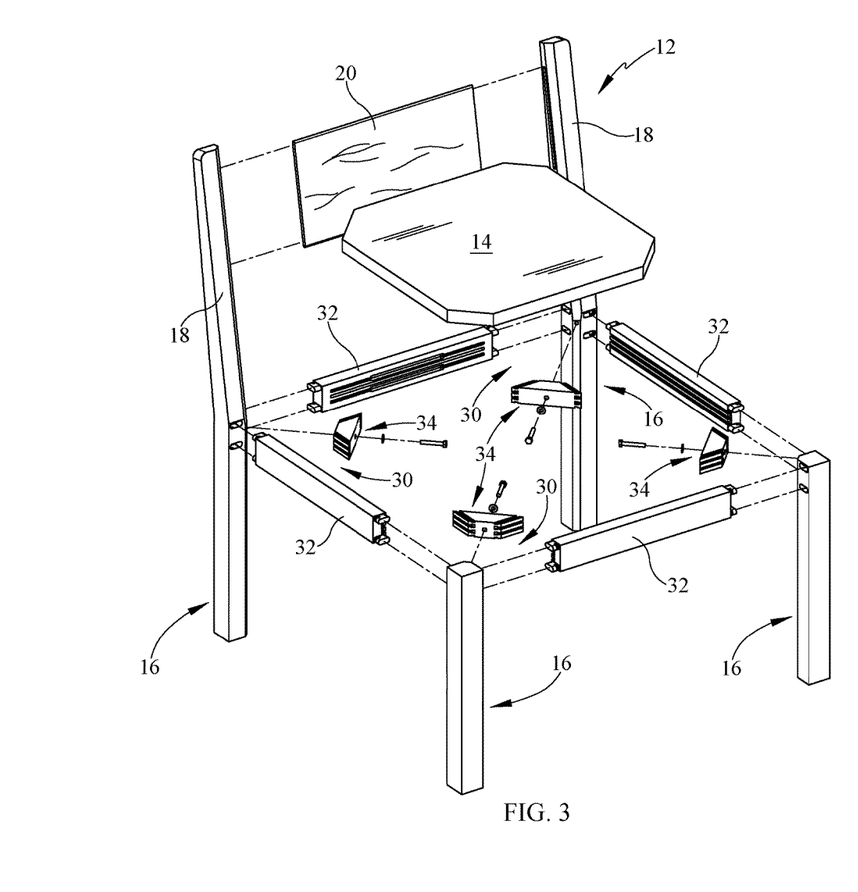
FIG. 3 depicts an exploded perspective view of the chair of FIG. 1 utilizing the furniture joinery.

Referring now to FIG. 3, an exploded perspective view of the exemplary chair 12 is depicted. In this view, the construction of the chair 12 utilizing the furniture joinery 30, is more easily depicted. The seat 14 is exploded from the top of the remainder of the chair 12 to reveal the furniture joinery 30 underneath.

The chair 12 includes four furniture supports 16. The supports 16 may be one or more legs for the chair 12 and in the instant embodiment, includes four supports. There are two front supports 16 and two rear supports 16 which are formed with the chair back supports 18. As previously described, they may be formed integrally with the furniture supports 16 or may be connected. In some embodiments, the chair back supports may not be utilized for example, in the case of a table or a stool without a back.

The furniture supports 16 are connected by a plurality of slide rails 32. Each of the slide rails 32 connects to two of the supports 16 in order to define the generally square shape of the seating area of the chair 12 upon which the seat 14 is positioned. At each corner of the chair 12, is a furniture support 16 and two slide rails 32. Each corner also comprises a slide block 34 which connects or engages the two side rails.

During the assembly process, the slide blocks 34 engage the slide rails 32 at each corner and the slide blocks 34 are connected to, for example by fastener or other structures, the furniture supports 16. The engagement of the slide blocks 34 with the furniture supports 16 forces the slide rails 32 in an outward direction away from the center of the chair 12 and causes engagement between the slide rail 32 and the furniture supports 16 to lock the structures together for a more sturdy assembly.

Figure 4:
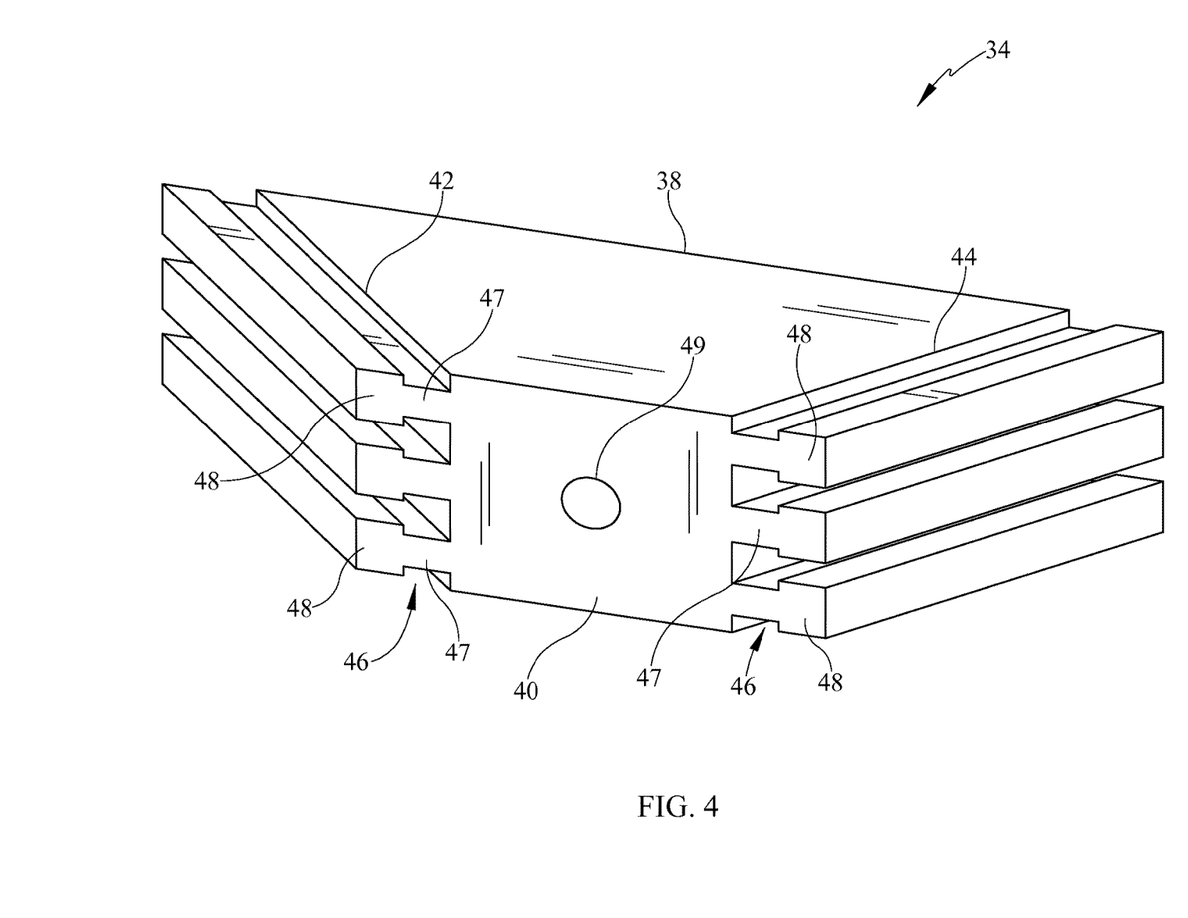
FIG. 4 is one embodiment of a slide block.

Referring now to FIG. 4, a perspective view of an exemplary slide block 34 is depicted. The slide block 34 has a long surface 38, a short surface 40 which is parallel to the long surface 38, and two angled surfaces 42, 44 extending between and at ends of the long and short surfaces 38, 40.

Along the angled surfaces 42, 44 are a plurality of slides 46. Each of the slides 46 includes a neck 47 and a head 48. The slides 46 include the neck 47 and the head 48 for engagement with the slide rails 32. The neck 47 is sized to have a width which is less than that of the heads 48 as shown in a vertical dimension in the depicted embodiment. Once the slides 46 are positioned in the slide rail 32, the heads 48 may retain the slides 46 within grooves of slide rail 32, and thus retain the slide block 34 to the slide rail 32.

In the instant embodiment, a plurality of slides 46 are shown. However, the slide block 34 may include a single slide or alternatively, two or more in order provide stable engagement with the slide rails 32. This may be dependent on the dimensions of the slide rail 32 and the slide block 34. Additionally, an aperture 49 is shown extending through the short surface 40. The aperture 49 extends through the short surface 40 and the long surface 38 so that a fastener 51 (FIG. 8) may extend through the slide block 34 and engage the furniture supports 16.

Figure 5:
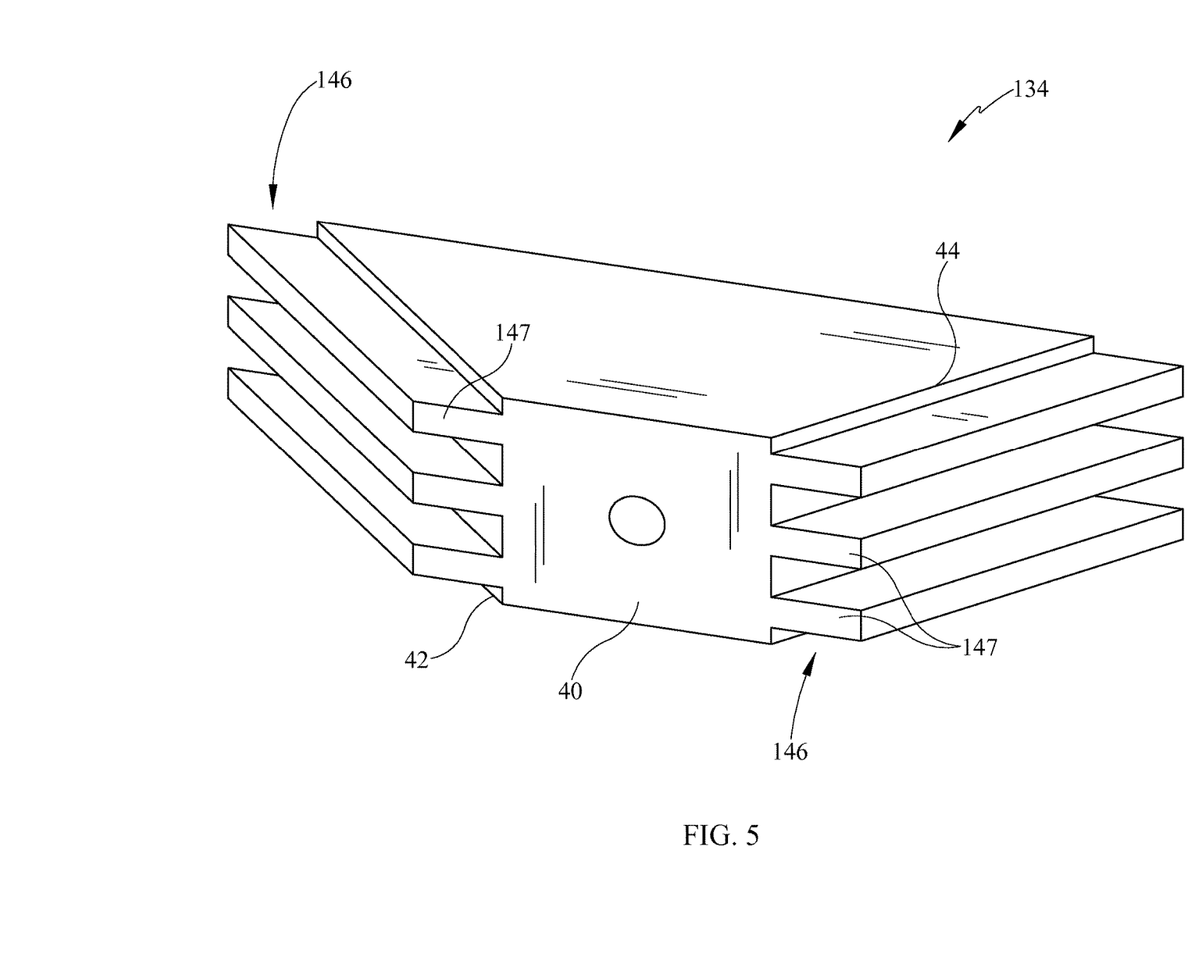
FIG. 5 depicts a perspective view of an alternate embodiment of slide block.

Referring now to FIG. 5, an alternate embodiment of the slide blocks 134 is depicted. The slide block 134 includes a short surface 40, a long surface (not shown), and two angled surfaces 42, 44 as in the previous embodiment. However, in this embodiment the one or more slides 146 are generally formed of necks 147 and do not comprise the heads as in the previous embodiment. Accordingly, the structure may be pushed into the slide rails 32 (FIG. 3) at any location along the slide rail 32. Further, the slide rail 32 need not utilize a groove with varying cross-sectional shape.

Figure 6:
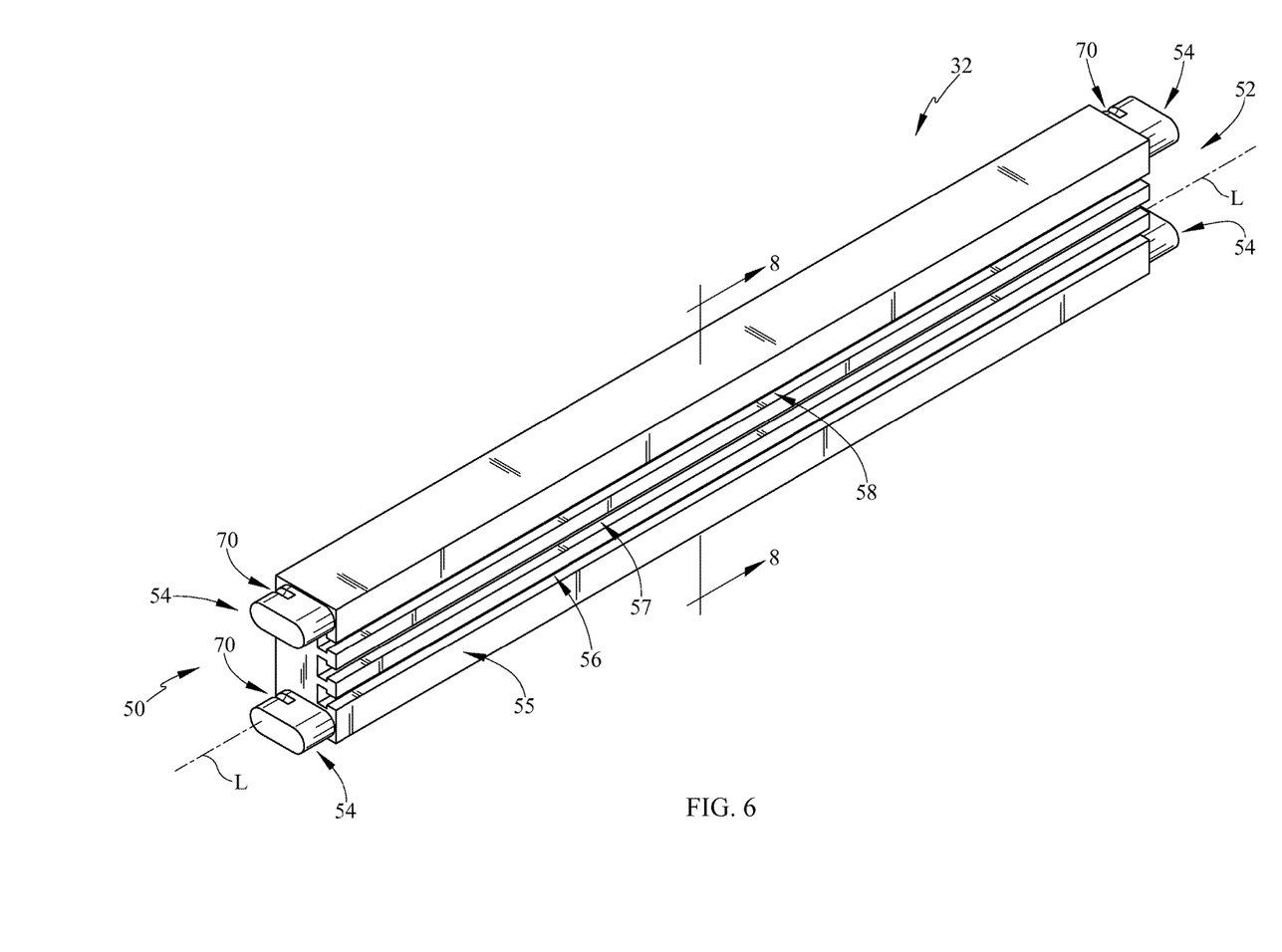
FIG. 6 is a first embodiment of a slide rail.

Referring now to FIG. 6, an embodiment of the slide rail 32 is shown. The slide rail includes a first end 50 and a second end 52. Each of the ends 50, 52 includes at least one tenon 54. In the instant embodiment, the first and second tenons 54 are located at each of the first and second ends 50, 52. However, the number of tenons 54 may be more or may be less depending on the height of the slide rail 32.

The slide rail 32 further comprises an inner surface 55 wherein a plurality of grooves 56, 57, 58 are located. The term "inner" is used since the exemplary surface faces inwardly relative to the furniture 10. This is not limiting however. The grooves 56, 57, 58 receive the slides 46, 146 of the embodiments of the slide blocks 34, 134. The number of grooves may vary and may or may not correspond to the number of slides. Additionally, the cross-sectional shape of the grooves 56, 57, 58 may vary depending on the cross-section shape of the slides 46, 146. In the depicted embodiment, the grooves 56, 57, 58 may be utilized with the plurality of slides 46. Alternatively, the slides 146 may be used with the depicted grooves 56, 57, 58 or alternatively, may be used with grooves which do not have varying cross-sectional shape. Thus, one skilled in the art will recognize the grooves may be of varying cross-section or may be of constant cross-section.

Also, as shown in FIG. 6, the grooves 56, 57, 58 extend through the ends of the slide rail 32. This allows the slide block 34 to be inserted in the slide rail 32 at ends 50, 52. In other embodiments, the grooves 56, 57, 58 may stop short of the ends so that the slide blocks 34 may not be inserted at or removed from the ends 50, 52 but instead, may be positioned centrally along the longitudinal axis L of the slide rail 32 and moved toward the ends 50, 52 but not through the ends.

Figure 7:
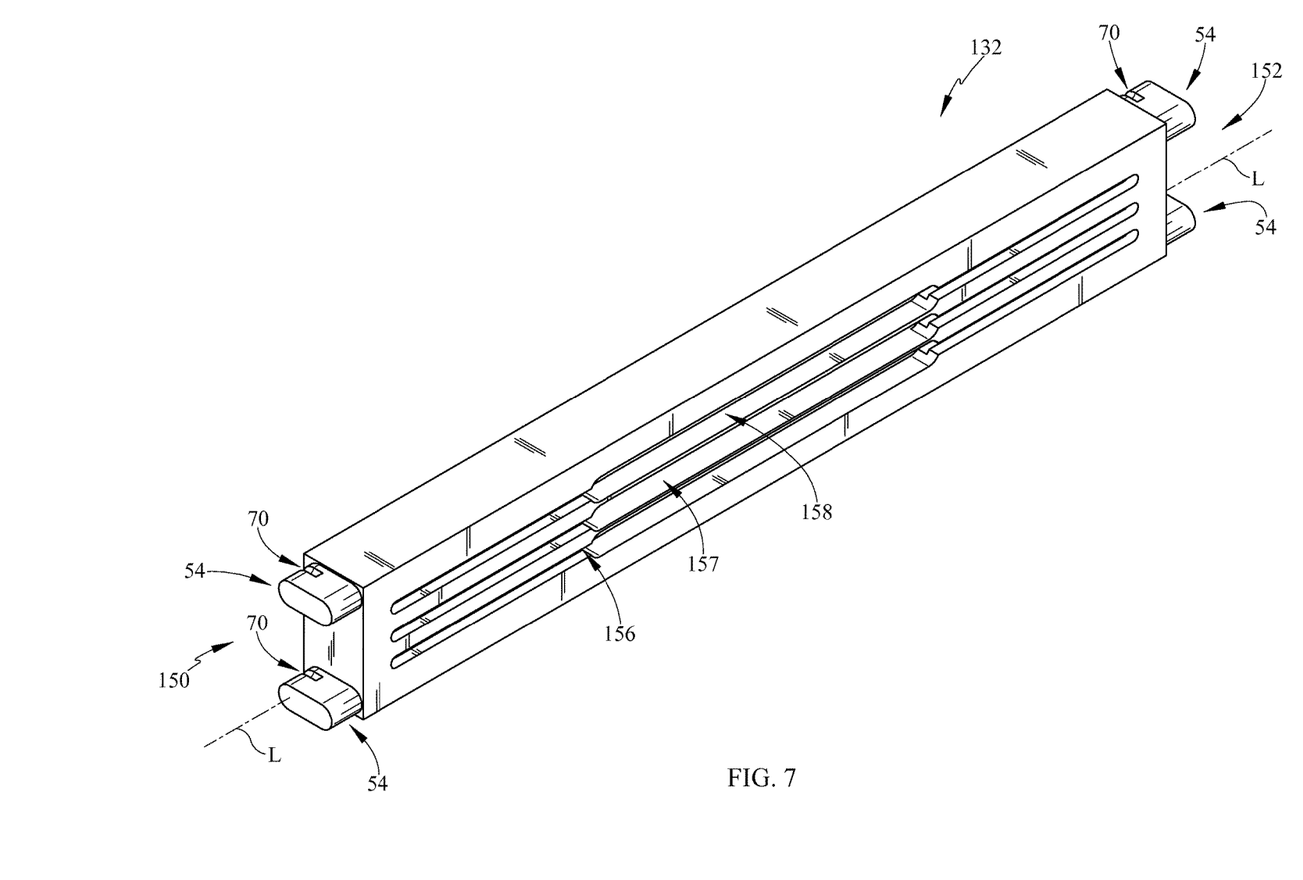
FIG. 7 is an alternate embodiment of a slide rail.

For example, referring now to FIG. 7, the grooves 156, 157, 158 are shown with an enlarged central area wherein the slide blocks 34 may be inserted and slidably moved towards the first and second ends 150, 152. In this embodiment, the slide blocks 34 may be inserted into the enlarged area at the central portion of the slide rail 132 and moved in a longitudinal direction toward the ends 150, 152. This embodiment again utilizes a groove with a varying cross-sectional shape. This embodiment with a cross-section is generally T-shaped to receive the head and neck of the slide blocks 34 and allow for positioning toward the ends of the slide rail 132.

Figure 12:
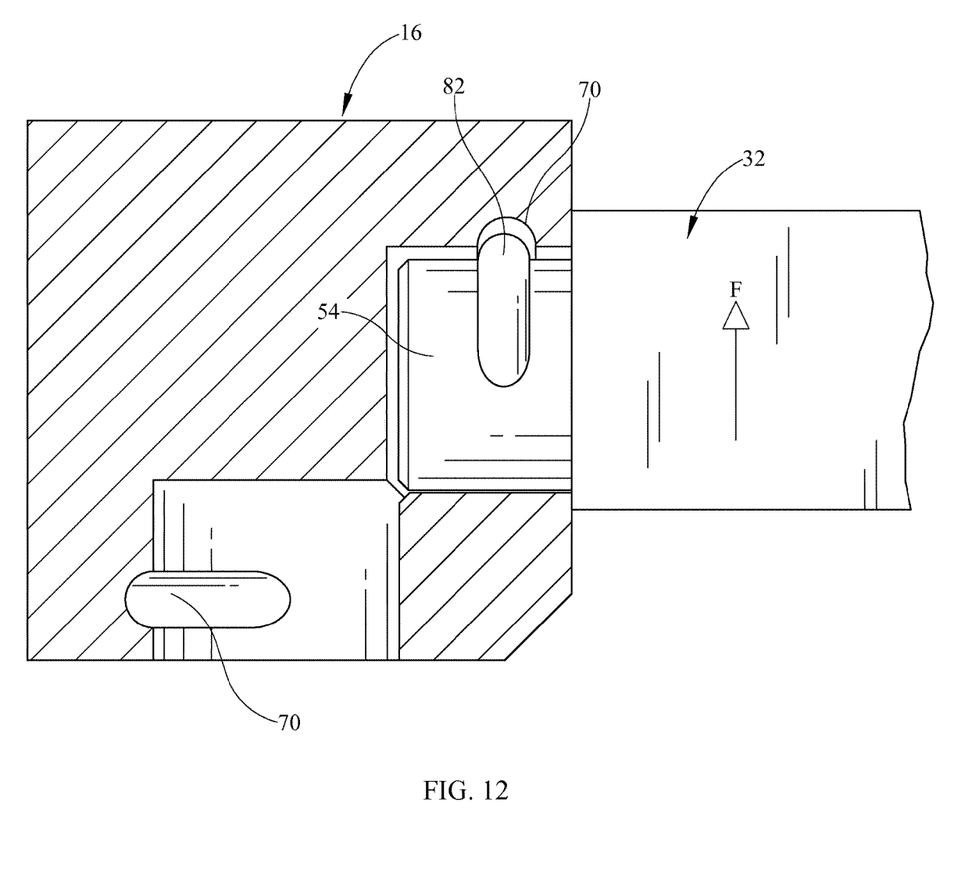

The embodiment of FIG. 7 also includes the at least one tenon 54 at longitudinal ends 150, 152. The tenons 54 include one of a notch 70 or a rib 82 (FIG. 12). The other of the rib or notch may be located in the furniture support 16 (FIG. 3) so as to aid the slide rail 32, 132 engaging the furniture supports 16. With additional reference to FIG. 3, one skilled in the art will recognize that the notch 70 or the rib 82 is oriented in an outward direction on the slide rail. The term "outward" is relative to the furniture orientation that is outward from the furniture interior. The notch 70 is generally cut in a direction which is at an angle to, and may be perpendicular to, the longitudinal axis L of the slide rail 32, 132. The engagement at an angle, or perpendicular to, the longitudinal axis improves engagement between the slide rail 32, 132 and the furniture support 16. This also inhibits removal of the slide rail 32, 132 in a longitudinal direction from the furniture support 16.

Figure 8:
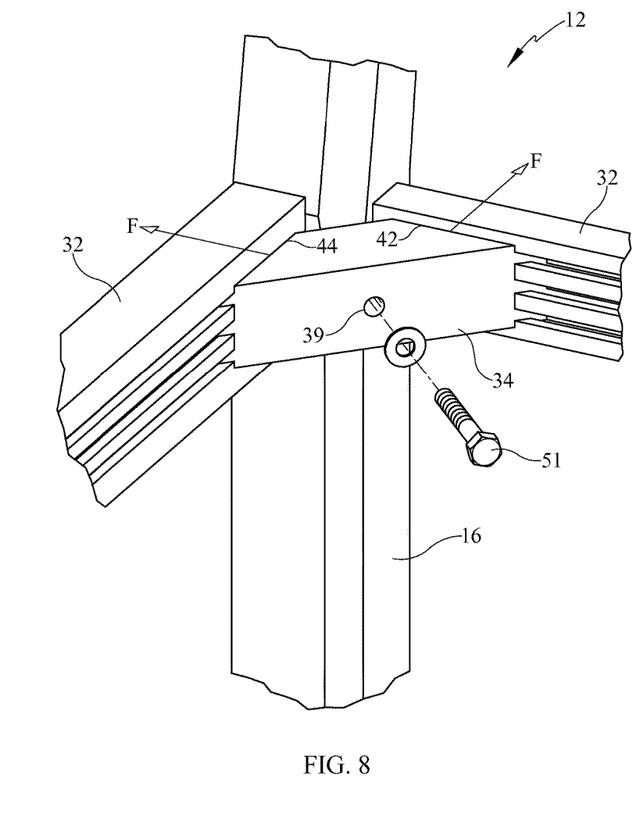
FIG. 8 is a detailed perspective view of the furniture joinery partially assembled.

Referring now to FIG. 8, a detailed perspective view of a corner of the chair 12 is depicted. An exemplary slide block 34 is shown engaging two slide rails 32. The slide rails 32 are shown engaging the furniture supports 16. As the fastener 51 is positioned through the fastening aperture 39, the slide block 34 is connected to the furniture support 16 and tightens toward the furniture support 16. This creates a force F acting in a direction perpendicular to the angled surfaces 42, 44 and through the slide rails 32. Each force F is shown acting from the slide block 34 through the slide rails 32. The forces F act in an outward direction and thus, force the slide rails 32 also in an outward direction away from the center or interior area of the furniture. This causes engagement of the ribs 82 and notches 70 (FIG. 12) to aid in retaining the structures.

Figure 9:
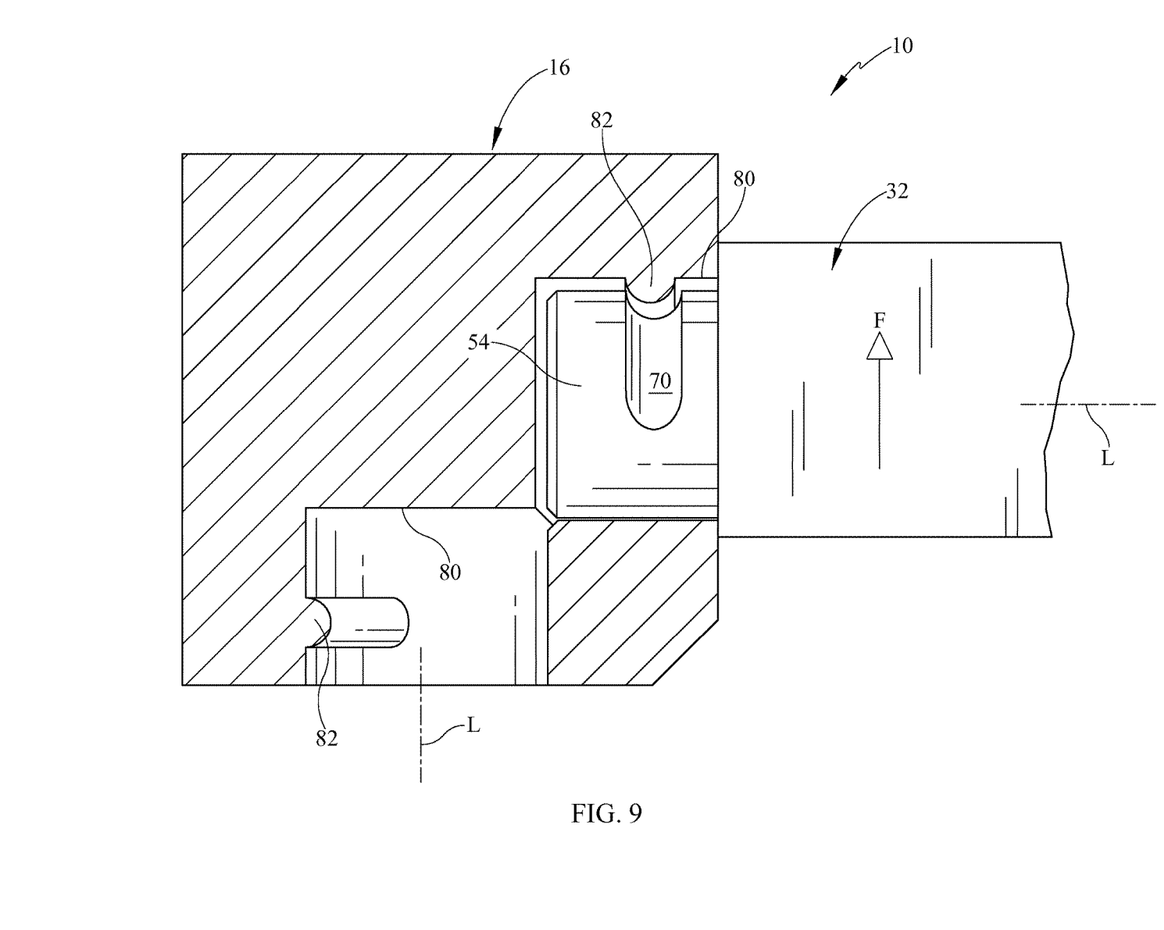
FIG. 9 depicts an upper cross-section view of the furniture joinery where the slide rail and furniture support engage one another.

With reference now to FIG. 9, a top section view of furniture 10 and more specifically, the furniture support 16 is shown. The furniture support 16 includes an aperture 80 on at least one surface. The instant embodiment utilizes apertures 80 on two perpendicular surfaces. However, other configurations may be utilized. Each aperture 80 includes a rib 82. The tenons 54 may be slidably positioned into the aperture 80 and the notches 70 are positioned adjacent to the ribs 82. The rib 82 and the notch 70 are shown generally perpendicularly to the longitudinal axis of the slide rail 32 as previously described. As depicted, the force F acting on the slide rail 32 forces the notch 70 and rib 82 into tighter engagement. Thus, as the fastener 51 (FIG. 8) is tightened, the notch 70 and rib 82 increase engagement. Once engaged in such manner, the slide rail 32 cannot be removed from the furniture supports 16 in a longitudinal L direction.

Figure 10:
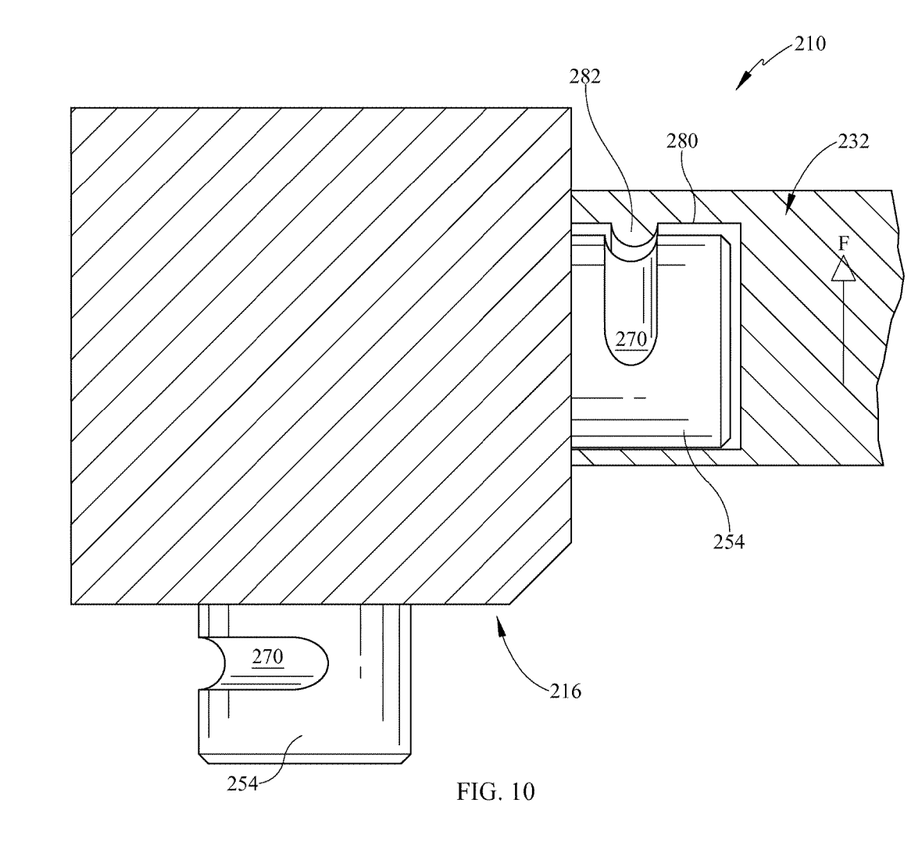
FIG. 10 is a section view of an alternate embodiment wherein the tenon and aperture of the furniture joinery are located on opposite parts.

Referring now to FIG. 10, an alternate embodiment is provided. In this embodiment, the furniture 10 is shown in a top section view. Opposite the previous embodiment, the furniture support 216 includes a tenon 254 and the slide rail 232 includes an aperture 280. Further, the notch 270 and rib 282 may be reversed so that the rib 282 is located on the slide rail 232 and the notch 270 is located on the furniture support 216. Thus, it may be understood by one skilled in the art that the tenon 254 and aperture 280 may be reversed from the slide sail 232 and furniture support 216 and likewise the rib 282 and notch 270 may also be reversed from the previous embodiments.

Figure 11:
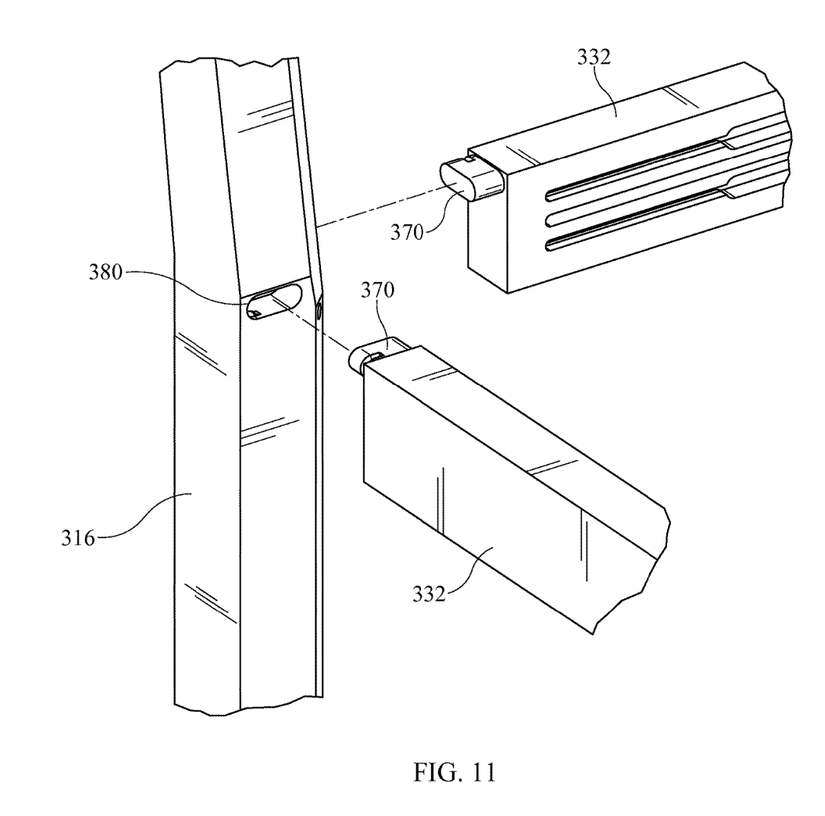
FIG. 11 is a perspective view of a further alternative embodiment wherein a slide rail may utilize a single tab; and, FIG. 12 is an upper cross-section view of a further alternative embodiment of the slide rail and furniture support.

Referring now to FIG. 11, a further alternative embodiment is provided wherein the slide rail 332 may include a single tenon 370 and the furniture support 316 may include a single aperture 380 corresponding to the single tenon 370. This embodiment differs from the previous embodiment wherein two tenons and two apertures were shown for engagement with each other. Various numbers of apertures and tenons therefore may be utilized depending on the size of the furniture support and the corresponding slide rail.

Referring to FIG. 12, a further sectional view is provided. This embodiment depicts the rib 82 located on the tenon 54 and the notch 70 located in the furniture support 16.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the invent of embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teaching(s) is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms. The indefinite articles "a" and "an," as used herein in the specification and in the claims, unless clearly indicated to the contrary, should be understood to mean "at least one." The phrase "and/or," as used herein in the specification and in the claims, should be understood to mean "either or both" of the elements so conjoined, i.e., elements that are conjunctively present in some cases and disjunctively present in other cases.

Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The foregoing description of several methods and an embodiment of the invention has been presented for purposes of illustration. It is not intended to be exhaustive or to limit the invention to the precise steps and/or forms disclosed, and obviously many modifications and variations are possible in light of the above teaching. It is intended that the scope of the invention and all equivalents be defined by the claims appended hereto.

What is claimed is:

1. A furniture joinery, comprising:
a slide rail having a plurality of longitudinal grooves, extending parallel to a longitudinal axis;
a tenon extending from said slide rail at an end, said tenon including an outwardly facing notch;
a substantially trapezoidal shaped slide block having a long surface, a short surface parallel to said long surface, and angled surfaces connecting ends of said long and short surfaces;
said slide block having a plurality of slides disposed within said plurality of longitudinal grooves;
a furniture support including an aperture for receiving said tenon of said slide rail, said aperture including a rib therein, wherein said aperture is sized to allow movement of said tenon toward or away from said rib;
a fastener extending through said slide block and engaging said furniture support wherein tightening of said fastener forces engagement of said notch and said rib by movement of tenon within said aperture in an outward direction to engage said rib.

2. The furniture joinery of claim 1, said plurality of slides each having a neck and a head.

3. The furniture joinery of claim 1, said plurality of grooves each having a first cross-sectional shape.

4. The furniture joinery of claim 3, said plurality of grooves further comprising a second cross-sectional shape differing from said first cross-sectional shape.

5. The furniture joinery of claim 3, said grooves extending from a first end to a second end of said slide rail.

6. The furniture joinery of claim 3, said grooves extending from near one end of said slide rail to near a second end of said slide rail.

7. The furniture joinery of claim 1 further comprising a second tenon at said end of said slide rail.

8. A furniture joinery, comprising:
a slide rail having one of a plurality of grooves or a plurality of slides;
at least one tenon extending from one of said slide rail or a furniture support;
a substantially trapezoidal shaped slide block having the other of said plurality of grooves or said plurality of slides;
wherein said plurality of slides may be slidably positioned in said plurality of grooves;
an aperture which receives said at least one tenon, said aperture located in the other of said slide rail or said furniture support;
said at least one tenon having at least one of a notch or a rib and said aperture having the other of said notch or rib, said aperture sized to allow movement of the tenon into the aperture and movement of one of the notch or rib toward or away from the other of the notch or rib;
said at least one notch and said rib engaging one another as said slide block is connected to said furniture support.

9. The furniture joinery of claim 8, said at least one tenon of said slide rail being an upper tenon and a lower tenon.

10. The furniture joinery of claim 9, said furniture support having an upper aperture and a lower aperture corresponding to said upper tenon and said lower tenon.

11. The furniture joinery of claim 8, said slide block having two angled surfaces.

12. The furniture joinery of claim 11, said two angled surfaces each having said plurality of slides.

13. The furniture joinery of claim 12, said two angled surfaces each engaging one of said slide rail or a second slide rail.

14. The furniture joinery of claim 12 said at least one notch facing outward.

15. The furniture joinery of claim 14, said slide block forcing said slide rail outward.

16. The furniture joinery of claim 8, said at least one rib extending perpendicularly to a longitudinal direction of said slide rail.

17. The furniture joinery of claim 16, said at least one notch formed perpendicularly to said longitudinal direction of said slide rail.

* * * * *